(12) United States Patent
Hayashi et al.

(10) Patent No.: US 6,477,526 B2
(45) Date of Patent: *Nov. 5, 2002

(54) SYSTEM FOR AND METHOD OF PROVIDING MAP INFORMATION (75) Inventors: Giichi Hayashi, Tokyo-to (JP); Toshiaki Nakano, Tokyo-to (JP)

(73) Assignees: Increment P Corporation, Tokyo-to (JP); Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,525

(22) Filed: Apr. 9, 1999

(65) Prior Publication Data

US 2002/0059296 A1 May 16, 2002

(30) Foreign Application Priority Data

Apr. 14, 1998 (JP) ............................. 10-102512

(51) Int. Cl.[7] .............................. G06F 17/30
(52) U.S. Cl. ........................ 707/4; 707/100; 707/102; 707/104.1; 707/200; 701/200; 701/208
(58) Field of Search ................. 340/990, 995; 701/201–202, 206, 208, 209–211, 200; 707/100, 200, 10, 104, 4, 104.1, 102; 711/157, 173; 709/217–219

(56) References Cited

U.S. PATENT DOCUMENTS 5,345,388 A * 9/1994 Kashiwazaki ............... 340/988

(List continued on next page.)

OTHER PUBLICATIONS

Bedetti, A. et al., "The GSI road management integrated software package", Conference Record on Vehicle Navigation and Information Systems Conference, Sep. 11–13, 1989, pp. A22–A27.*

Tsuzawa, M. et al., "Advanced Mobile Traffic Information and Communication System—AMTICS", IEEE—Vehicle Navigation and Information Systems Conference, Sep. 11–13, 1989, pp. 475–483.*

Tsuzawa, M. et al., "Advanced Mobile Traffic Information and Communication System—AMTICS," Vehicle Navigation and Information Systems Conference, Sep. 11–13, 1989, pp. 475–483.*

Primary Examiner—Jean M. Corrielus
Assistant Examiner—Shahid Alam
(74) Attorney, Agent, or Firm—Ladas & Parry (57) ABSTRACT The route calculation server receives starting point data and destination data corresponding to a starting point and a destination which a user designates by the user terminal, and calculates a route from the starting point to the destination. The map server includes a map database, and communicates with the user terminal via the network. The route calculation server stores calculated route data together with route identification information associated with the route data, and transmits the route identification information to the user terminal via the network. The map server receives the route identification information from the user terminal via the network, obtains the route data associated with the route identification information from the route calculation server, produces route display picture data including map picture on which the calculated route is represented, and transmits the route display picture data to the user terminal.

10 Claims, 9 Drawing Sheets

U.S. PATENT DOCUMENTS

| | | | | |
|---|---|---|---|---|
| 5,543,789 A | * | 8/1996 | Behr et al. | 340/995 |
| 5,671,408 A | * | 9/1997 | McBride | 379/112.06 |
| 5,682,525 A | * | 10/1997 | Bouve et al. | 707/104 |
| 5,739,772 A | * | 4/1998 | Nanba et al. | 340/988 |
| 5,758,313 A | * | 5/1998 | Shah et al. | 701/205 |
| 5,802,492 A | * | 9/1998 | DeLorme et al. | 340/990 |
| 5,848,373 A | * | 12/1998 | DeLorme et al. | 701/200 |
| 5,944,769 A | * | 8/1999 | Musk et al. | 701/201 |
| 5,948,040 A | * | 9/1999 | Delorme et al. | 701/201 |
| 6,038,569 A | * | 3/2000 | Ashby et al. | 701/201 |
| 6,073,076 A | * | 6/2000 | Crowley et al. | 701/208 |
| 6,081,803 A | * | 6/2000 | Ashby et al. | 340/990 |
| 6,092,076 A | * | 7/2000 | McDonough et al. | 345/866 |
| 6,104,316 A | * | 8/2000 | Behr et al. | 340/995 |
| 6,107,944 A | * | 8/2000 | Behr et al. | 340/995 |
| 6,112,200 A | * | 8/2000 | Livshutz et al. | 707/4 |
| 6,282,489 B1 | * | 8/2001 | Bellesfield et al. | 701/201 |
| 6,292,743 B1 | * | 9/2001 | Pu et al. | 455/456 |
| 6,336,111 B1 | * | 1/2002 | Ashby et al. | 701/208 |

* cited by examiner

SYSTEM FOR AND METHOD OF PROVIDING MAP INFORMATION

BACKGROUND OF THE INVENTION

1. Field of the Invention

The present invention relates to a technique for providing map information stored in a database via a network, for example, the internet. More specifically, the present invention relates to a system for and a method of calculating an optimum route between two points designated by a user and displaying the calculated route on a user terminal.

2. Description of the Prior Art

Nowadays, on the internet using the internet protocol, various information from around the world are provided and exhibited by WWW (World Wide Web) servers, and a user can obtain desired and/or necessary information by operating a user terminal connected to the internet to make the information search or retrieval. There are a number of various information services offered via the internet, and a map information search and display service is one of them. In this kind of service, a user can search and download desired map information and display it on his or her user terminal by accessing the WWW server having a map database via the internet. Specifically, when a user designates an address, a place name, a station or a name of a certain facility or shop, the map around that designated place appears on the user terminal as a picture. Therefore, the user can readily recognize the exact position of the place of interest, such as the station, facility, etc., by referring to the map picture displayed on the user terminal.

One prime purpose that the user uses the map information search and display service is to know the route to a certain destination. In such a case, the user searches and displays the map around the destination by using this service, and judges and determines, by himself, the best route in consideration of the geographical information such as roads, trains, etc.

SUMMARY OF THE INVENTION

It is an object of the present invention to provide map information providing system and method capable of promptly calculating and displaying the best route (i.e., guidance information advising the best road to choose and/or necessary turns at the corners, etc.) to a certain destination together with the map information around there.

According to one aspect of the present invention, there is provided a map information providing system including: a main server for communicating with a user terminal via a network; a route calculation server for receiving starting point data and destination data corresponding to a starting point and a destination which a user designates by the user terminal, and for calculating a route from the starting point to the destination; a map server including a map database and for communicating with the user terminal via the network, wherein the route calculation server stores calculated route data together with route identification information associated with the route data, and transmits the route identification information to the user terminal via the network, and wherein the map server receives the route identification information from the user terminal via the network, obtains the route data associated with the route identification information from the route calculation server, produces route display picture data including map picture on which the calculated route is represented, and transmits the route display picture data to the user terminal.

In accordance with the system thus configured, the route calculation server receives starting point data and destination data corresponding to a starting point and a destination which a user designates by the user terminal, and calculates a route from the starting point to the destination. The map server includes a map database, and communicates with the user terminal via the network. The route calculation server stores calculated route data together with route identification information associated with the route data, and transmits the route identification information to the user terminal via the network. The map server receives the route identification information from the user terminal via the network, obtains the route data associated with the route identification information from the route calculation server, produces route display picture data including map picture on which the calculated route is represented, and transmits the route display picture data to the user terminal.

In this way, when the user designates desired starting point and the destination on the user terminal, the route calculation is performed based on the designated starting point and the destination. Therefore, the user can easily and promptly view the route display picture including the calculated route on the user terminal. Further, since the calculated route data is not transmitted to the terminal device, but the route identification information associated with the calculated route data is transmitted to the user terminal, there is no need to transmit large amount of data via the network between the user terminal and the servers, thus accelerating the processing and reducing the burden on the data transmission.

In a preferred embodiment, the route calculation server may receive calculation condition information, which the user designates by the user terminal, via the network, and calculate the route which satisfies the calculation condition information. By this, the user can precisely designate the calculation condition according to his or her needs and obtain the route satisfying the conditions.

Preferably, the route display picture data may include map picture data of a single map picture on which the starting point, the destination and the calculated route are represented. By this, the user can grasp the route at a glance. Further, the route points on the calculated route may be additionally represented on the single map picture. Thus, the user can easily know the important route points on the way to the destination.

According to another aspect of the present invention, there is provided a map information providing method performed in a system which provides route information to a user of a user terminal via a network and which includes a map server including a map database and connected to the network, and a main server connected to the network, the method including the steps of: receiving starting point data and destination data corresponding to a starting point and a destination which a user designates by the user terminal, and calculating a route from the starting point to the destination; storing route data of the calculated route together with route identification information associated with the route data; transmitting the route identification information to the user terminal via the network; at the map server, receiving the route identification information from the user terminal; at the map server, obtaining the route data associated with the route identification information, producing route display picture data including map picture on which the calculated route is represented by referring to the map database, and transmitting the route display picture data to the user terminal.

Preferably, the step of calculating the route may include the steps of: receiving calculation condition information that the user designates by the user terminal; and calculating the route which satisfies the calculation condition information.

According to still another aspect of the present invention, there is provided a map information providing method performed in a system which provides route information to a user of a user terminal via a network and which includes a map server including a map database, a main server and a route calculation server which are connected to the network, the method including the steps of: at the main server, receiving starting point data and destination data corresponding to a starting point and a destination, which a user designates by the user terminal, via the network; transmitting the starting point data and the destination data from the main server to the route calculation server via the network; at the route calculation server, calculating a route from the starting point to the destination and storing route data of the calculated route together with route identification information associated with the route data; transmitting the route data and the route identification data from the route calculation server to the main server; transmitting the route identification information from the main server to the user terminal via the network; at the map server, receiving the route identification information from the user terminal; at the map server, transmitting the route identification information to the route calculation server and receiving the route data associated with the route identification information from the route calculation server; and at the map server, producing route display picture data including map picture, on which the calculated route is represented, based on the route data and the map database, transmitting the route display picture data to the user terminal, and controlling the user terminal to display the route display picture data.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENT

The preferred embodiment of the present invention will now be described below with reference to the attached drawings.

The present invention provides a map information providing system which can provide a user with a best route connecting two geographical points that the user arbitrarily chose. Namely, when the user designates a desired starting point and a desired destination by operating the user terminal, the system automatically calculates the best route between them and displays it on the user terminal. In the route calculation, the user may input and/or designate some route calculation conditions, according to which the system calculates the best route. The preferred embodiment of the system will be described below in detail.

[1] System Configuration

Figure 1:
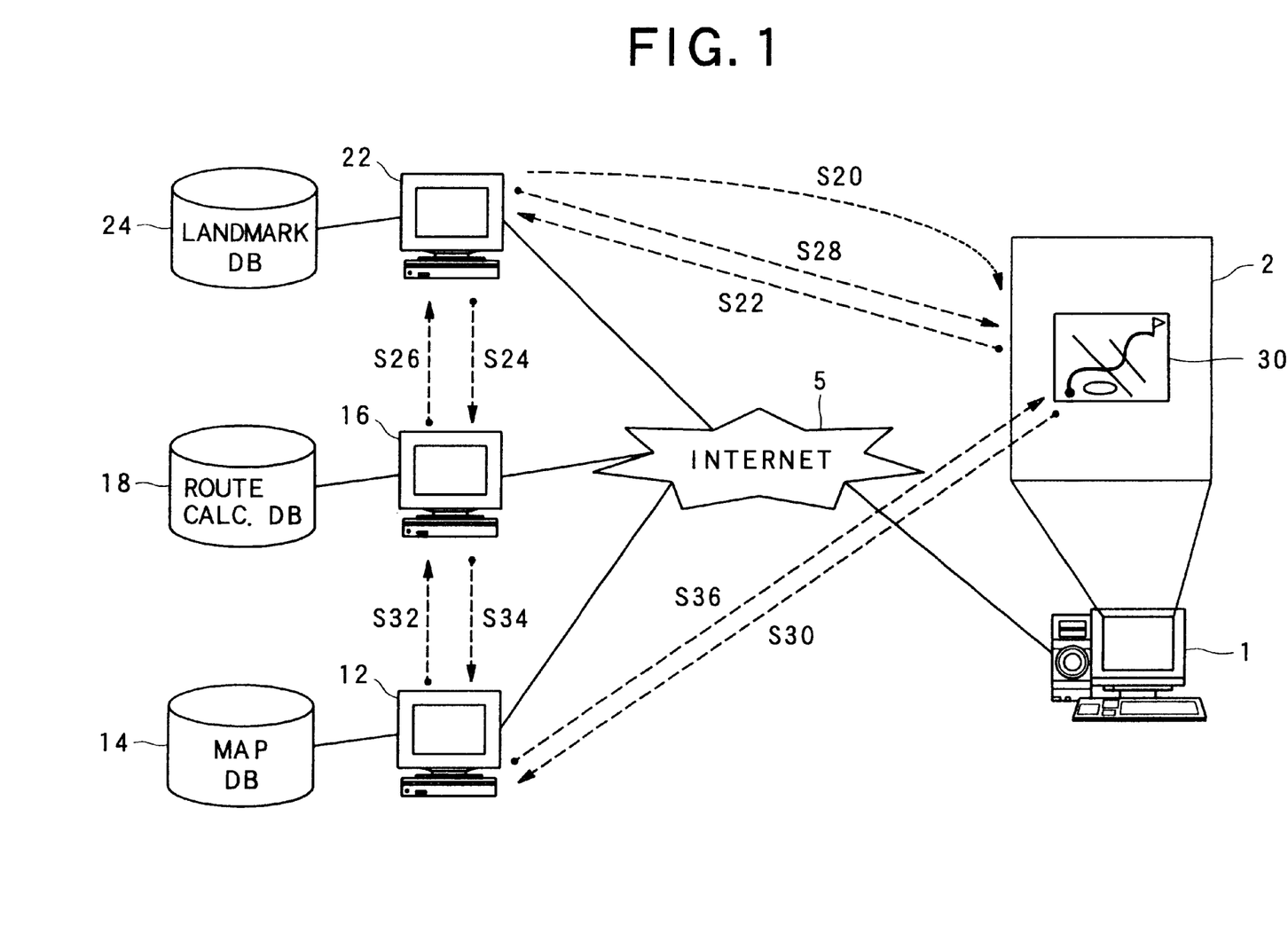
FIG. 1 is a block diagram showing a schematic configuration of a map information providing system according to an embodiment of the present invention.

FIG. 1 shows a schematic configuration of a map information providing system according to an embodiment of the present invention. In FIG. 1, a user terminal 1, a WWW server 22, a route calculation server 16 and a map server 12 are connected to the internet 5. In the user terminal 1, an application program so-called WWW browser is installed, by which the user can make use of the service of WWW servers. In the example of FIG. 1, the user in the user terminal 1 makes a connection to the WWW server 22 by using the WWW browser, and views the homepage of the map information providing site to make use of the map information providing service. The terminal 1 has a display screen 2 for displaying the map information searched and obtained.

The map server 12 provides map information to carry out the map information providing service on the internet 5, and is connected to the map database 14. The map database 14 includes the geographical position information (e.g., coordinate information) on the map, such as the latitude and longitude, the scale and the size of the map, etc., as well as the picture data of the map information corresponding to the position information. The picture information of the map is prepared in a hierarchical structure having multiple hierarchies according to the scale of the map. Namely, plural map picture data of different scales, for example, the map of the entire Japan level, the prefecture level, and so on are prepared, and each of the map picture data is assigned with the area file names specifying the picture data. The scale information and the area files are names associated with each other.

The map server 12 refers to the map database 14 based on the geographical position information supplied from the user terminal 1, searches and obtains the picture data of corresponding map information from the map database 14, and then transmits the map information thus obtained to the user terminal 1 via the Internet 5. Also, the map server 12 carries out the retrieval and transmission of the map information in response to the request from the WWW server 22. Further, at the time of displaying the route calculation result (i.e., route display picture) on the display screen 2 of the user terminal 1, the WWW server 12 performs a processing for representing the calculated route on the map picture data to produce the route display picture and transmits it to the user terminal 1.

The WWW server 22 makes the connection to the map information providing site, which is a WWW site. WWW is a global information system on the internet which provides multimedia information such as character information, picture information and audio information by using hypertext. A WWW server is a server on the internet linked by the WWW, and a site offering a service by using the WWW is called "WWW site". The WWW server 22 transmits, to the user terminal 1, the HTML text which is mainly used to communicate information on the internet 5. All of the input information and the output result information, which are necessary in the route calculation processing described later, are transmitted to the user terminal 1 via the WWW server 22. The WWW server 22 is connected to the landmark database 24. The landmark database 24 stores plural addresses, station names, landmarks (such as facilities, play areas, amusement areas, shops, etc.) as well as data indicating the correspondences of those data and their geographical position information. Therefore, the WWW server 22 can specify the address, the station name, the landmark, etc., from the geographical position information corresponding thereto, by accessing the landmark database 24. Reversely, by accessing the landmark database 24, the geographical position information corresponding to certain address, station, landmark, etc. can be obtained from the name of them.

The route calculation server 16 calculates the optimum route from the starting point to the destination, both designated by the user, and produces route data indicating the route thus calculated. The program necessary for the route calculation is stored in the route calculation server 16. The route calculation server 16 is connected to the route calculation database 18 in which map data necessary for the route calculation is stored. It is noted that the map data stored in the route database 18 is dedicated only to the route calculation and different from the map data stored in the map database 14. Namely, data stored in the map database 14 is prepared for the purpose of displaying the map picture, and hence includes marks and/or figures of the buildings in the area and character data representing the names of the buildings, in addition to the road information. On the contrary, the route calculation database 18 mainly includes vector data indicating geographical roads, and further includes associated information such as the attribute of the road (e.g., expressway or general road, broad road with many lanes or narrow road with a few lanes, etc.). The route calculation server 16 calculates the optimum route between two geographical points designated by the user by utilizing those data stored in the route calculation database 18. The details of the route calculation processing will be described later.

While each server is configured as an independent server in the embodiment described above, the WWW server 22 and the route calculation server 16 may be configured by a single hardware, for example.

[2] Map Information Providing Operation

Figure 2:
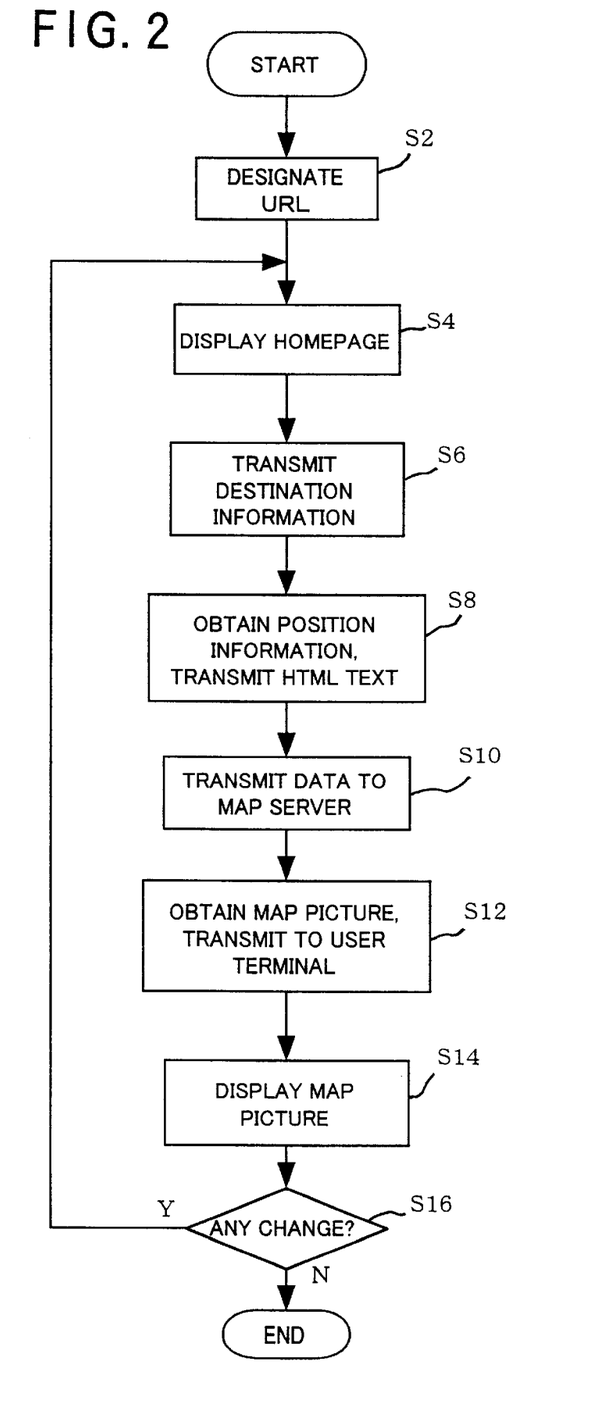
FIG. 2 is a flowchart showing a map information providing operation.
Figure 3:
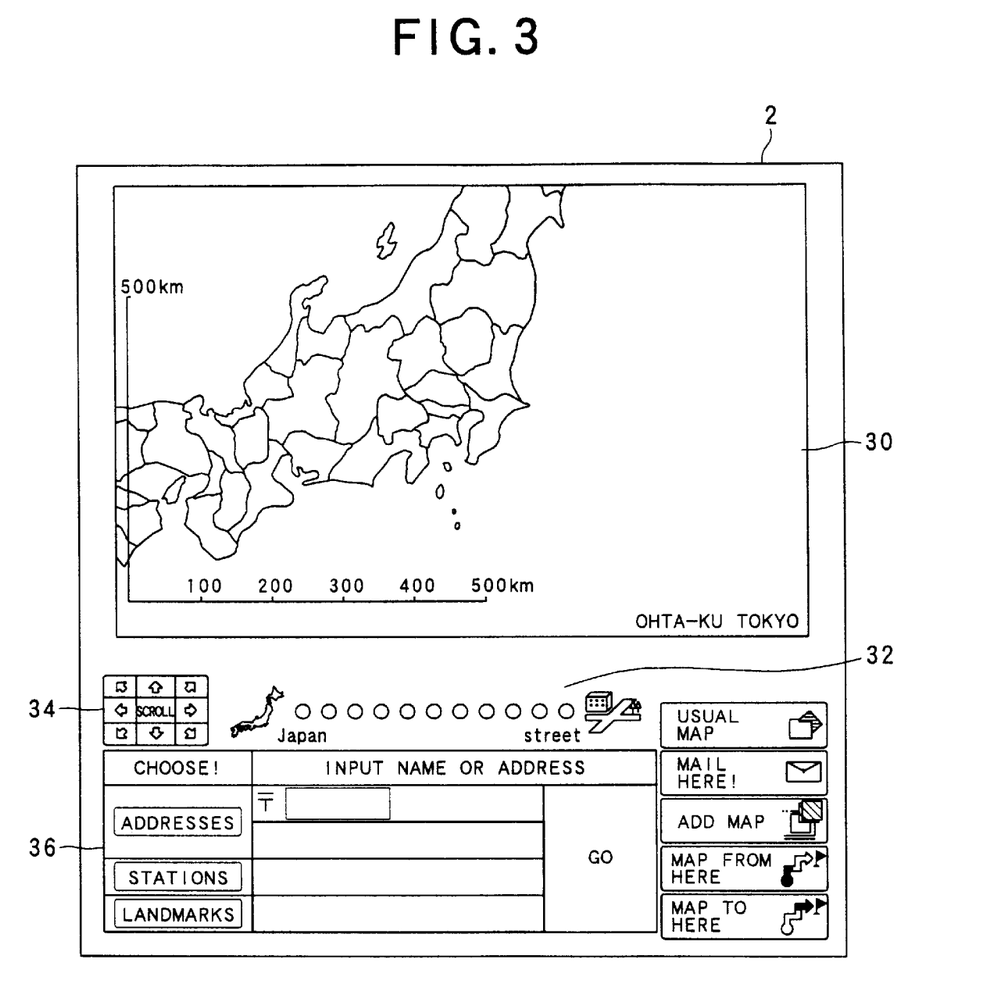
FIG. 3 is an example of a map display in the map information providing operation.
Figure 4:
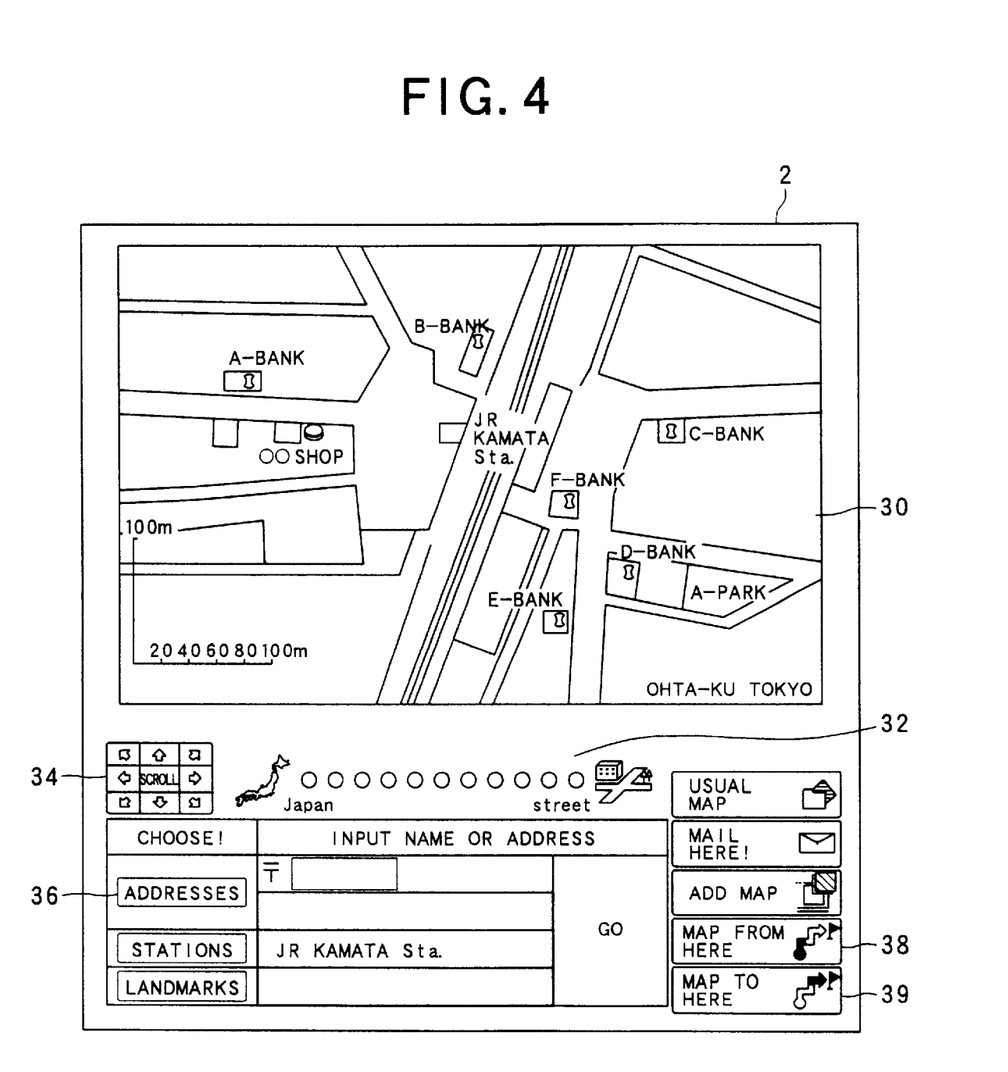
FIG. 4 is another example of a map display in the map information providing operation.

Next, the map information providing operation will be described with reference to FIGS. 2 to 4. FIG. 2 is a flowchart showing the map information providing operation, and FIGS. 3 and 4 are examples of map display on the screen at some stages of the map information providing operation. Here, it is assumed that the user of the user terminal 1 accesses the map information providing site to download the desired map information.

First, the user operates the WWW browser installed in the user terminal 1 to designate the URL (Uniform Resource Locator) of the map information providing site (step S2). URL is an address information designating a certain site linked on the WWW. By this, the user terminal 1 establishes the connection to the WWW server 22 via the internet 5. In response, the WWW server 22 sends the HTML (HyperText Markup Language) text of the map information providing site to the user terminal 1. HTML text is a text file described by the HTML language and may include the storage location of the associated picture information, audio information and the like. The WWW browser in the user terminal 1 receives this HTML text, and displays it on the display screen 2 (step S4).

FIG. 3 shows an example of the initial picture of the map information providing site displayed on the screen 2. In FIG. 3, there is a map display portion 30 at the upper side of the screen 2, in which map picture is displayed. Just below the map display portion 30, there is a scale designation portion 32, which indicates the scale of the map displayed within the map display portion 30. The buttons in the scale designation portion 32 correspond to different scales (11 levels in this example). In the example shown in FIG. 3, the map picture is displayed with its smallest scale (nearest to the Japan mark at its left side). In order to magnify the displayed map picture, the user should click the button at right side (closer to the "street") to display the map picture of larger scale. On the left of the scale designation portion 32, a scrolling portion 34 is displayed. The scrolling portion 34 is used to display the map picture of the area around the currently displayed area and includes the arrows in eight directions from the currently displayed position. If the user clicks the upward arrow in the scrolling portion 34, for example, the map picture of the neighboring area in north direction of the currently displayed area appears on the map display portion 30.

Below the scale designation portion 32, there is provided an input portion 36 used to designate and/or input the desired place to be searched. On the left side of the input portion 36, buttons of "ADDRESSES", "STATIONS" and "LANDMARKS" are shown. By clicking those buttons, a list of candidate addresses, station names or landmark names appears. Then, the user can choose the desired candidate to display the map picture of that place. On the right side of the input portion 36, input boxes of address, station name and landmark name are displayed, and the user can input address and/or name of the desired place via an input device such as a keyboard and/or mouse in the user terminal 1. For example, if the user inputs the station name "JR KAMATA Sta." in the station name box, the map picture around the JR KAMATA station appears on the map display portion 30 as shown in FIG. 4. On the right side of the input portion 36, some special function buttons are displayed. When performing the route display according to the present invention, the route calculation buttons 38 and 39 are used. The detail of the processing will be described later.

With the homepage of the map information providing site being displayed, the user designates or inputs the destination to be displayed. This may be done by designating the candidate from the list shown at the left side in the input portion 36, or alternatively be done by directly typing an address or a name in the input box. The destination information thus designated is transmitted from the user terminal 1 to the WWW server 22 via the internet 5 (step S6). At the same time, the information of map scale currently in use is also transmitted to the WWW server 22. The WWW server 22 receives these information and refers to the landmark database 24 to obtain the geographical position information (i.e., coordinate information) corresponding to the designated destination. Then, the WWW server 22 produces the HTML text including this geographical position information and transmits it to the user terminal (step S8). This HTML text includes the name of the server (i.e., the map server 12) to which the user terminal 1 in receipt of the HTML text should access, the name of the map file selected based on the map scale currently being selected, messages and/or sentences to be displayed on the user terminal 1.

The WWW browser in the user terminal 1 receives this HTML text, and displays the messages and/or sentences included therein. In addition, the user terminal 1 transmits information including the map file name, the geographical position information, the size information, the scale information and the like to the map server 12 which is designated in the description of the HTML text (step S10). Then, the map server 12 accesses the map database 14 to extract the picture data of the area, centering on the geographical position information thus received and covering the range determined based on the size information, from the picture data of the map file specified by the scale information and the geographical position information, and then transmits it as the map picture data (e.g., GIF data) to the user terminal 1 (step S12).

The user terminal 1 displays the map picture data transmitted from the map server 12 on the screen 2 at the position designated by the HTML text which has previously been received from the WWW server 22 (step S14). Thus, the map picture of the destination which the user has designated is displayed in the map display portion 30. If the destination is changed by the user's re-designation or re-input, steps S6 to S14 are repeated so that the map display is renewed based on the new geographical position information and the like. If the scale and/or display position is changed during the display of the map picture, the process returns to step S6 to transmit the new geographical position information and/or scale information to the WWW server 22. Subsequently, the WWW server 22, the map server 12 and the user terminal 1 execute the same processing to renew the map display. For example, if the user operates the scale designation portion 32 on the screen 2 to change the scale information, the map file to be read out by the map server 12 from the map database 14 is changed, or alternatively the range of the map picture data within the same map file to be transmitted to the user terminal 1 is changed. On the other hand, if the user clicks the point of interest on the map picture displayed within the map display portion 30, the geographical position information of the clicked point is transmitted to the map server 12. Then, the map server 12 accesses the map database 14 to extract the map picture data of the area centering on the clicked point, and transmits the map picture data to the user terminal 1. As a result, the map shown within the map display portion 30 is changed to the map picture which is centering on the point which the user has clicked.

In the above description, the map server 12 is configured to directly designate the map file by the file name thereof. Alternatively, the map files of the map server 12 may be configured according to the unique management scheme. In that case, in stead of directly designating the map file name, the map server 12 accesses the map files in the map database 14 by using a CGI (Common Gateway Interface) serving as the interface between the WWW server and the program running on the server. For example, in step S10, the user terminal 1 transmits the CGI for map display to the map server 12.

[3] Route Calculation Processing

Next, the route calculation processing will be described with reference to FIGS. 1, 4 to 9. In the route calculation processing, when the user of the user terminal 1 designates desired starting point and destination, the map information providing system calculates the optimum route between those points and displays it on the screen 2 of the user terminal 1. In the following description, it is assumed that the user designates the starting point "JR KAMATA station" and the destination "Keihin-Express (K-exp.) KAMATA station" and begins the route calculation processing. It is noted that the dot arrows (S20 to S36) in FIG. 1 show the data transmission directions in steps S20 to S36 of the flowchart shown in FIG. 5.

Figure 5:
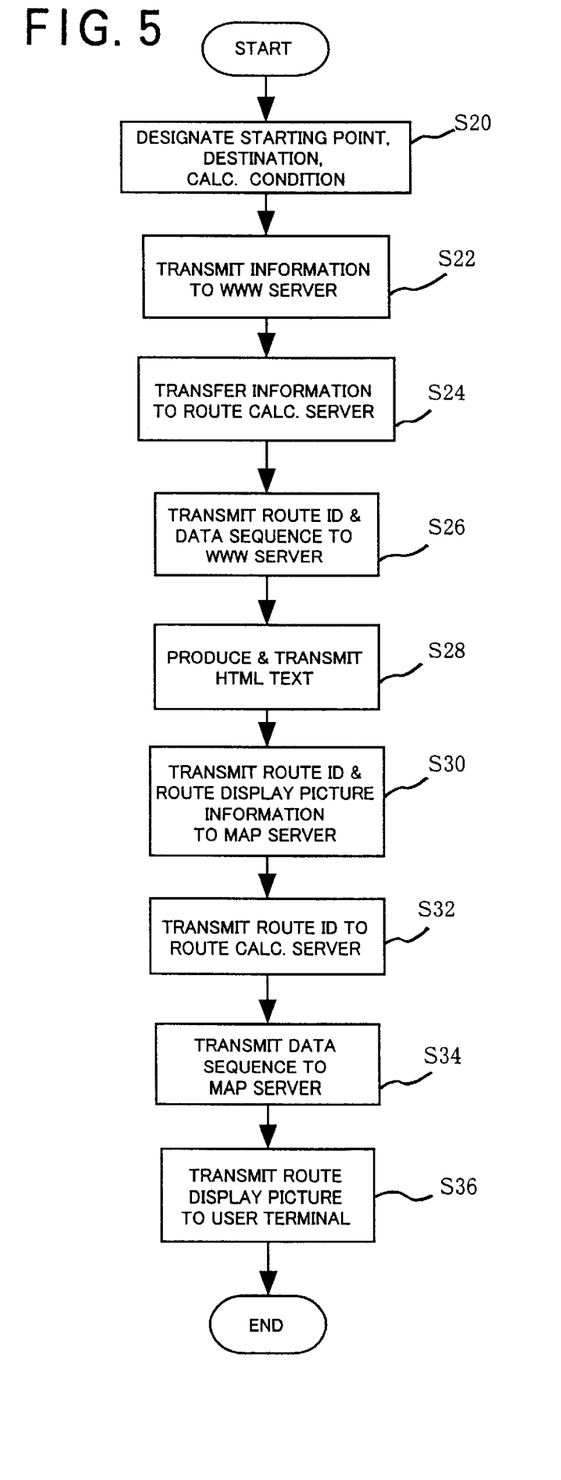
FIG. 5 is a flowchart showing a route calculation processing according to the present invention.

First, the user designates the starting point, the destination and the calculation conditions by the user terminal 1 (step S20). In this example, the user first operates the WWW browser to make the "JR KAMATA station" appear on the screen 2. This may be done by typing "JR KAMATA Sta." in the input portion 36. Alternatively, this may be done by clicking the position of the JR KAMATA station on the map picture displayed in the map picture display portion 30. In response, the WWW server 22 transmits the TML text to the user terminal 1 and performs the processing described in the paragraph of the map information providing operation. As a result, the JR KAMATA station is designated, and the map picture is displayed in the map display portion 30 with the JR KAMATA station displayed at its center.

Figure 6:
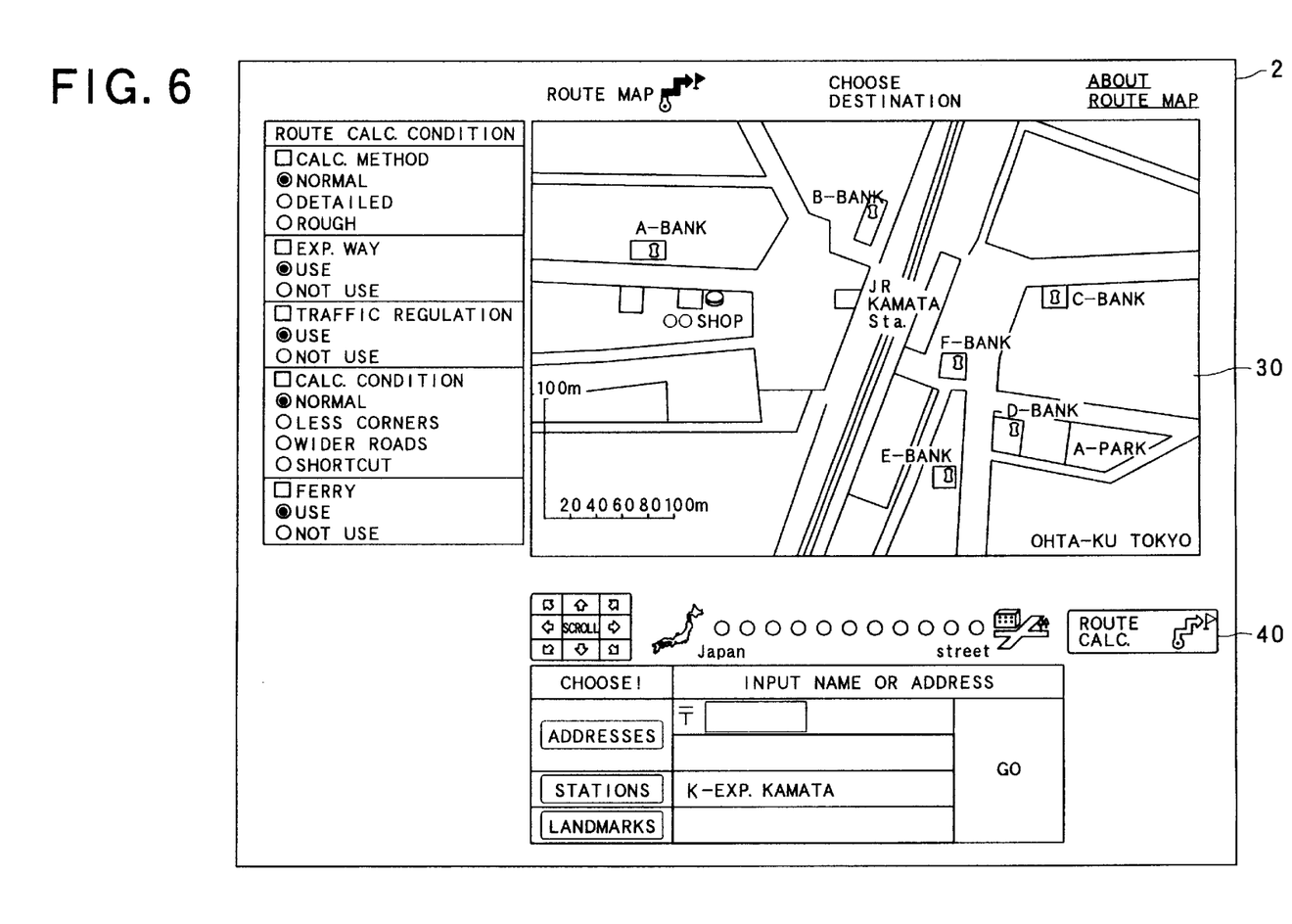
FIG. 6 is an example of the display in a state of destination input.

Subsequently, in order to designate the destination, the user clicks the route calculation button 38 on displayed on the screen 2. In the example shown in FIG. 4, two route calculation buttons 38 and 39 are shown. The button 38 is used when the route is calculated using the point designated (i.e., displayed at the center of the map display portion 30) at the time of clicking the button 38 as the starting point. On the other hand, the button 39 is used when the route is calculated using the point designated at the time of clicking the button 39 as the destination. In this example, since the JR KAMATA station has been set to the starting point, the user clicks the button 38. When the user clicks the button 38, the picture requesting the user to designate the destination is displayed on the screen 2. FIG. 6 shows an example of such a picture, wherein a message "CHOOSE DESTINATION" is shown at the top of the map display portion 30. The designation of the destination can also be made by typing the letters of the destination in the input portion 36 or clicking the point of the designation on the map picture within the map display portion 30, like the manner of designating the starting point. The example of FIG. 6 shows the case where the user typed "JR KAMATA sta.", as the destination, in the input portion 36. Thus, the destination is designated.

Subsequently, the user designates the route calculation condition. The route calculation condition is considered in the route calculation processing, and the route calculation program calculates the optimum route to meet the route calculation condition. As shown in FIG. 6, examples of the route calculation condition include "CALCUATION METHOD", "USE OF EXPRESSWAY", "TRAFFIC REGULATION", "CALCULATION CONDITION", "USE OF FERRY", and the like. The "CALCULATION METHOD" prescribes whether the route is calculated with considering narrow streets and/or pathways, or is calculated with considering only arterial roads and excluding the narrow streets, or calculated in the intermediate level of them. The "USE OF EXPRESSWAY" or "USE OF FERRY" prescribe whether or not the expressway or ferry is taken into consideration in the route calculation. The "TRAFFIC REGULATION" prescribes whether or not the traffic regulations such as one-way limitation and/or left- or right-turn inhibition are to be considered. While such regulations should be considered normally in the case of vehicle driving, they may be disregarded in the case of walking or bicycle driving. Further, the "CALCULATION CONDITION" prescribes the special conditions, for example, turns should be reduced, broader roads are preferred, a shortcut should be calculated, or the like. When the designation of the route calculation conditions is completed, the user clicks the route calculation button 40. In response, the starting point, the destination and the route calculation conditions are fixed and transmitted to the WWW server 22 (step S22). It is noted that, in the course of the map display processing described above, the map display on the screen is needed to be changed in some cases and hence the user terminal 1 may communicate with the WWW server 22 and/or the map server 12 for plural times, according to need.

Next, the WWW server 22 transfers information of the starting point, the destination and the route calculation conditions, which are transmitted from the user terminal 1, to the route calculation server 16 (step S24). The route calculation server 16 calculates, using the received information and the map information stored in the route calculation database 18, the optimum route which satisfies the route calculation conditions designated by the user. While the route calculation method will be described later in detail, the resultant route is in the form of the sequence of data each indicating the route points (i.e., X and Y coordinates) on the calculated route. Then, the route calculation server 16 assigns an ID (hereinafter referred to as "route ID") to the route point data sequence thus obtained, and stores the route point data sequence in association with the route ID. Then, the route calculation server 16 returns the route ID and the route point data sequence to the WWW server 22 (step S26). Subsequently, the WWW server 22 determines the map picture data suitable to display the calculated route in a single picture on the screen, the coordinate of the center of the map picture, the scale of the map picture, and so on (these information will be hereinafter referred to as "route display picture information") on the basis of the route point sequence data transmitted from the route calculation server 16. At the same time, the WWW server 22 calculates the total distance of the calculated route from the route point data sequence thus received. Then, the WWW server 22 produces the HTML text including the route ID corresponding to the calculated route, the total distance thus calculated, the route display picture information and necessary messages and/or sentences, and transmits them to the user terminal 1 (step S28). It is important that the WWW server 22 does not transmit the route point data sequence itself, calculated by the route calculation server 16, but transmits the route ID, which is associated with the route point data sequence, to the user terminal 1. In practice, the route point data sequence representing the calculated route has a large data amount, and hence it is not transmitted to the user terminal 1. Instead, in the present invention, the route ID associated with the calculated route is transmitted to the user terminal 1 and is used for the management of the route information. This simplifies the route information management and relieves the burden in the data transmission via internet.

Figure 7:
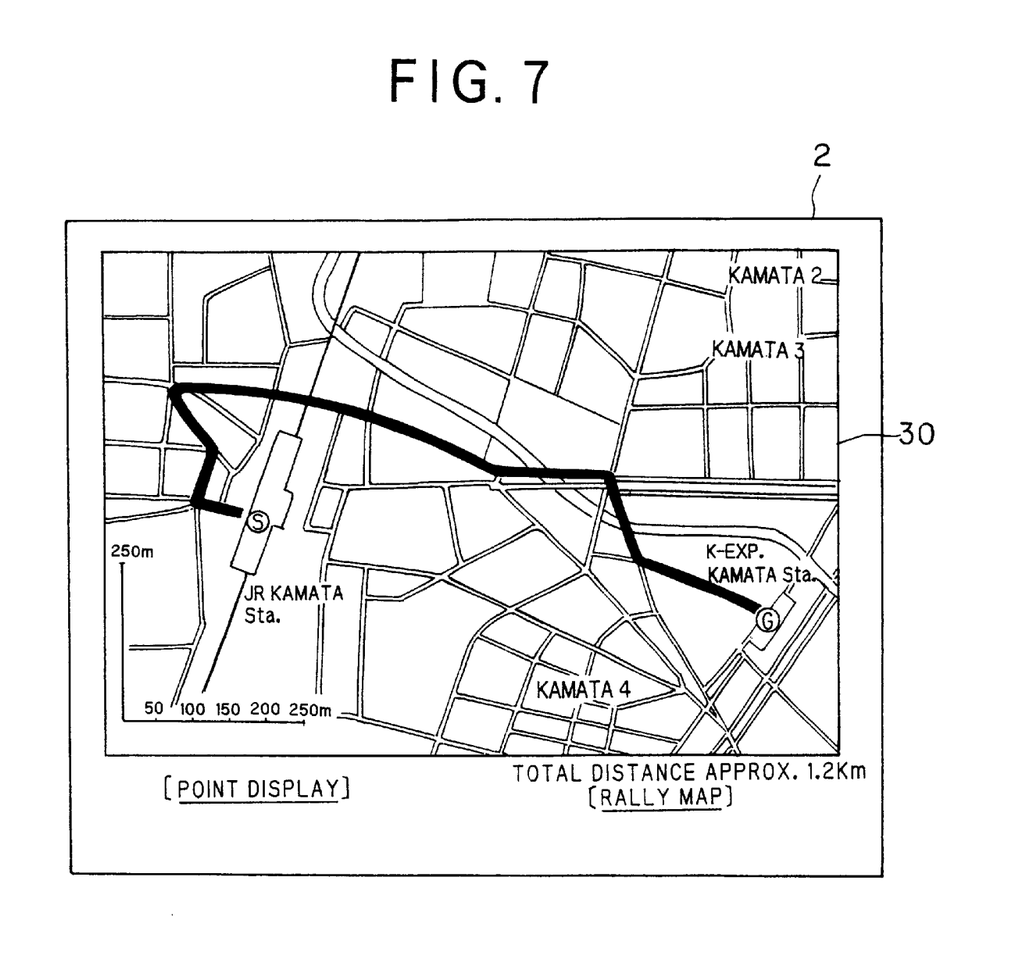
FIG. 7 is an example of the route display picture.

The user terminal 1 receives the HTML text, and displays the character data such as the messages, the total distance of the route, etc., on the screen 2 (see. FIG. 7). Further, the user terminal 1 transmits the route ID and the route display picture information included in the HTML text to the map server 12 (step S30). The map server 12 accesses the map database 14 based on the route display picture information, obtains the corresponding map picture data, and distributes it on the memory. At the same time, the map server 12 transmits the route ID to the route calculation server 16 (step S32). The route calculation server 16 receives the route ID, reads out the route point data sequence associated with the route ID, and sends the data sequence to the map server 12 (step S34). The map server 12 receives the data sequence and produces the map picture data including route display (hereinafter referred to as "route display picture") by emphasizing (e.g., coloring) the coordinate points of the route point data sequence on the map display data on the memory. Then, the map server 12 converts the route display picture into the GIF data and transmits it to the user terminal 1 (step S36).

The user terminal 1 receives the route display picture, and displays it at the position designated by the HTML text which has been previously received from the WWW server 22. An example of the display is shown in FIG. 7. In the route display picture on the screen 2, the starting point is represented by the mark "S", the destination is represented by the mark "G", and the route therebetween is represented by the emphasized (e.g., colored) lines, which will be called as "emphasized route". Thus, the user can recognize the optimum route from the starting point to the destination. Further, since the route display picture shows the route from the starting point to the destination entirely in a single displayed picture, the user can grasp the entire route at a glance. This is quite helpful for the user.

Figure 8:
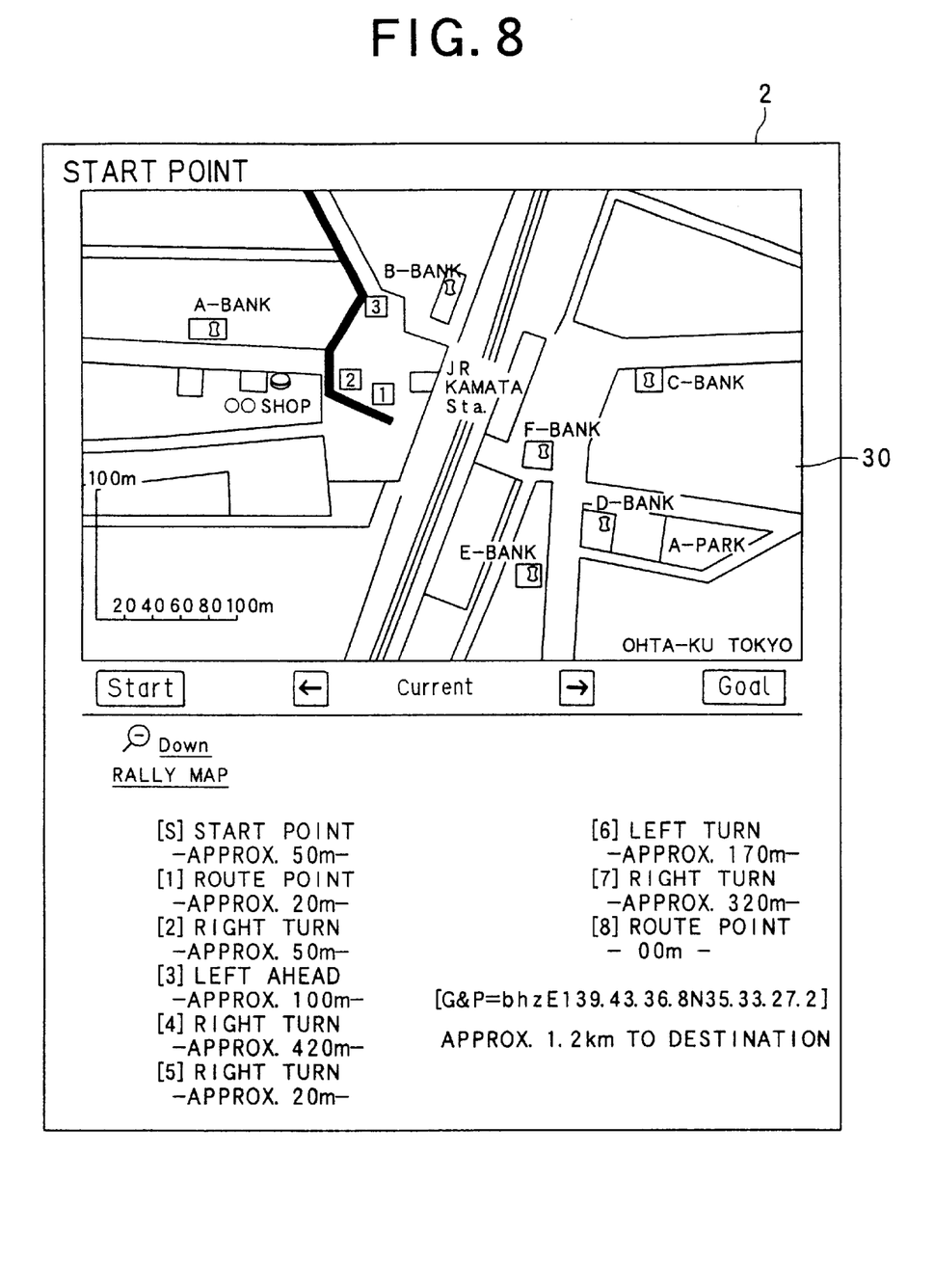
FIG. 8 is another example of the route display picture.
Figure 9:
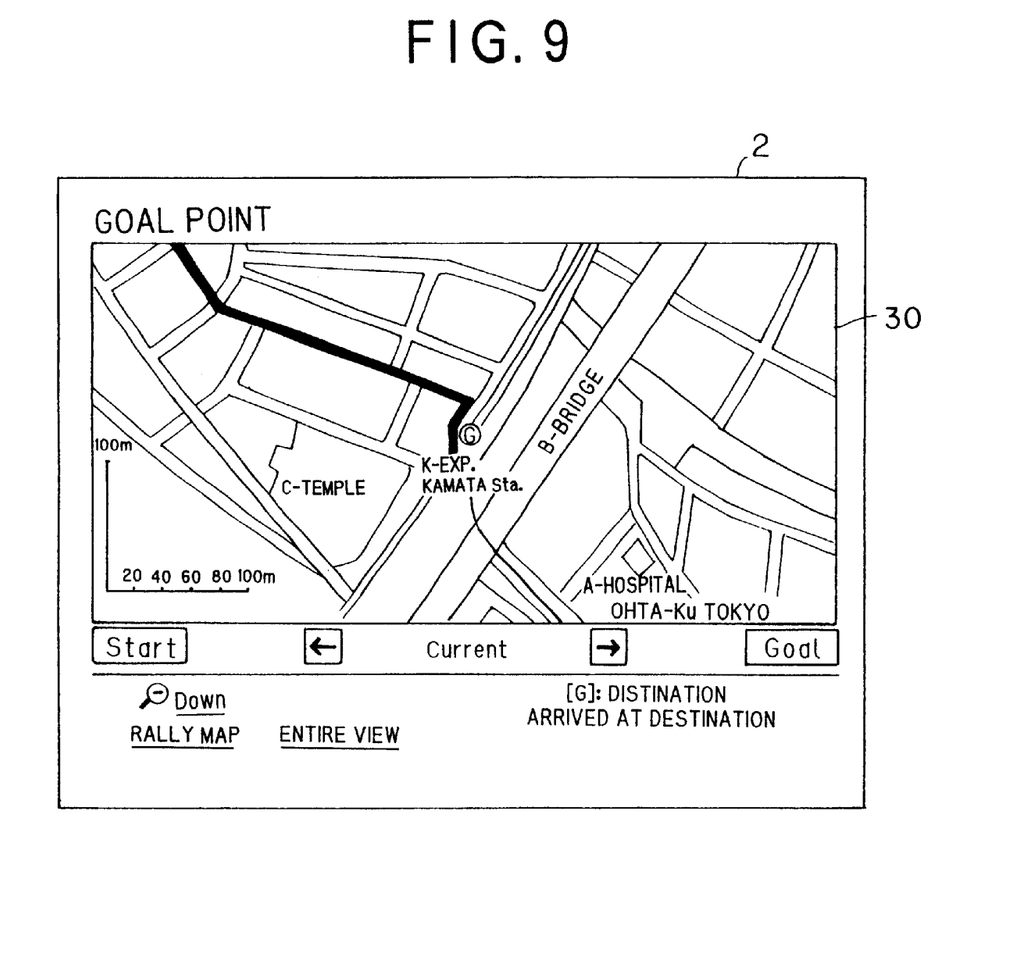
FIG. 9 is still another example of the route display picture.

Furthermore, in order to obtain more detailed map information including the turning points and the like, the user can clicks the "POINT DISPLAY" button in FIG. 7 so that more specific map information around the starting point, the destination, or the turning points on the way to the destination (hereinafter also referred to as "route point") are displayed. By way of example, FIG. 8 shows a detailed map around the starting point, i.e., JR KAMATA station, and FIG. 9 is a detailed map around the destination, i.e., K-exp. KAMATA station. In both of FIGS. 8 and 9, the calculated route is expressed as the emphasized route (colored and bold in this example). In addition, the route points on the way from the starting point to the destination are represented by the numbers indicating the travel order of those points. Furthermore, as shown in FIG. 8, the approximate distance between the route points as well as the travel direction at the route points may be shown.

[4] Route Calculation Method

Next, the route calculation method performed in the route calculation server 16 will be briefly described. As a route calculation method (including calculation algorithm, data structure, etc.), there are known various methods used in a map viewer software employed in a car navigation system and/or a personal computer. In the present invention, there is no limitation on the route calculation method, and any one of the known route calculation methods may be used. By way of example, a general route calculation method usable in the present invention will be outlined below.

In this example, the roads, intersections and the like on the map are regarded and processed as a route network. Specifically, a certain geographical point or intersection is regarded as a node, and the road connecting certain points is regarded as a link. Thus, a road on the map can be regarded as a route network. Data corresponding to the nodes and the links are stored in the above-mentioned route calculation database. In addition, necessary attribute information (associated information), if any, is appended to the data of each node or link. For instance, to a certain node corresponding to an intersection, the traffic regulation information (e.g., left or right turn being inhibited) is stored in association with the node. Similarly, to a certain link corresponding to a road, the attribute information such as the lane number of the road, one-way or not, expressway or general road, may be stored. Further, each link corresponding to road has "weight" information, which represents a certain kind of value associated with that link. Generally, the assumed time required to pass the link (i.e., road) is used as the "weight".

By referring to the route calculation database storing the above mentioned information, the system determines the best route from the starting point to the destination, both designated by the user. In the calculation, the calculation conditions designated by the user are taken into consideration. Specifically, all of the possible routes (i.e., route candidates) connecting the starting point and the destination are derived, and the sum of the weights of the nodes included in each route candidate is calculated for all of the route candidates. The sum thus calculated represents the assumed total required travel time for the route candidate. Then, one of the route candidates, having the minimum sum value, is determined as the optimum route (shortest route). However, if the user designates the calculation condition, only the route candidates satisfying that condition are subjected to the optimum route determination. For example, if the user has set the calculation condition that "Expressway is not used", the route candidates including the expressway are excluded from the route candidates used in the optimum route determination. When the optimum route is determined in this way, the nodes included in the optimum route may be displayed as the route points as shown in FIG. 8. It is noted that the above description is merely an example of the route calculation method applicable to the present invention, and other various route calculation method may be used in the map information providing system according to the present invention. As mentioned above, since various route calculation methods are known and the present invention may use anyone of them, further description of the route calculation method will be omitted.

As described above, according to map information providing system of the present invention, the route calculation server calculates the optimum route when the user designates the desired starting point, destination and calculation conditions. Then, the user terminal communicates with the WWW server and the map server to display the map display picture data on the screen of the user terminal. Therefore, the route search can be easily carried out by using the internet.

Further, the route calculation server assigns the route ID to the route points data sequence representing the calculated route, and stores them in association with each other. The WWW server transmits, not the route point data sequence itself, but the route ID associated with the data sequence to the user terminal. The user terminal transmits the received route ID to the map server, receives the route display picture including the emphasized route, and displays it on the screen. Namely, the route point data sequence, generally having large data amount, is not transmitted via the internet, and the route ID is transmitted to manage the route display. Therefore, the communication with the user terminal may be accelerated. Further, since the route display picture with the emphasized route representation is produced by the map server and transmitted to the user terminal as normal picture data, route display can be carried out without the need of special software other than the normal browser in the user terminal.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-102512 filed on Apr. 14, 1998 including the specification, claims, drawings and summary is incorporated herein by reference in its entirety.

What is claimed is:

1. A map information providing system comprising:
a main server for communicating with a user terminal via a network;
a route calculation server for receiving starting point data and destination data corresponding to a starting point and a destination which a user designates by the user terminal, and for calculating a route from the starting point to the destination;
a map server comprising a map database and for communicating with the user terminal via the network;
wherein the route calculation server stores calculated route data together with route identification information associated with the calculated route data, the calculated route data comprising a string of data indicating X and Y coordinates of points on the route and comprising no picture data, and transmits the route identification information and outline information of the route associated with the calculated route data to the user terminal via the network, and
wherein the map server receives the route identification information from the user terminal via the network, obtains the route data associated with the route identification information from the route calculation server, produces route display picture data including map picture on which the calculated route is represented by emphasized lines on the basis of said string of data indicating said X and Y coordinates, and transmits the route display picture data to the user terminal, the route display picture data compressed in predetermined format.

2. A system according to claim 1, wherein the route calculation server receives calculation condition information, which the user designates by the user terminal, via the network, and calculates the route which satisfies the calculation condition information.

3. A system according to claim 1, wherein the route display picture data comprises map picture data of a single map picture on which the starting point, the destination and the calculated route are represented.

4. A system according to claim 3, wherein the route points on the calculated route are additionally represented on the single map picture.

5. A map information providing method performed in a system which provides route information to a user of a user terminal via a network and which comprises a map server including a map database and connected to the network, and a main server connected to the network, the method comprising the steps of:
receiving starting point data and destination data corresponding to a starting point and a destination which a user designates by the user terminal, and calculating a route from the starting point to the destination;
storing calculated route data of the calculated route together with route identification information associated with the calculated route data, the calculated route data comprising a string of data indicating X and Y coordinates of points on the route and comprising no picture data;
transmitting the route identification information and outline information of the route associated with the calculated route data to the user terminal via the network;
at the map server, receiving the route identification information from the user terminal;
at the map server, obtaining the route data associated with the route identification information, producing route display picture data including map picture on which calculated route is represented by emphasized lines on the basis of said string of data indicating said X and Y coordinates by referring to the map database, and transmitting the route display picture data to the user terminal, the route display picture data compressed in predetermined format.

6. A method according to claim 5, wherein the step of calculating the route comprising the steps of:
   receiving calculation condition information that the user designates by the user terminal; and
   calculating the route which satisfies the calculation condition information.

7. A map information providing method performed in a system which provides route information to a user of a user terminal via a network and which comprises a map server including a map database, a main server and a route calculation server which are connected to the network, the method comprising the steps of:
   at the main server, receiving starting point data and destination data corresponding to a starting point and a destination, which a user designates by the user terminal, via the network;
   transmitting the starting point data and the destination data from the main server to the route calculation server via the network;
   at the route calculation server, calculating a route from the starting point to the destination and storing calculated route data of the calculated route together with route identification information associated with the calculated route data, the calculated route data comprising a string of data indicating X and Y coordinates of points on the route and comprising no picture data;
   transmitting the route data and the route identification data from the route calculation server to the main server;
   transmitting the route identification information and outline information of the route associated with the calculated route data from the main server to the user terminal via the network;
   at the map server, transmitting the route identification information to the route calculation server and receiving the route data associated with the route identification information from the route calculation server; and
   at the map server, producing route display picture data including map picture, on which the calculated route is represented by emphasized lines on the basis of said string of data indicating said X and Y coordinates, based on the map database, transmitting the route display picture data to the user terminal, and controlling the user terminal to display the route display picture data, the route display picture data compressed in predetermined format.

8. The system according to claim 1, wherein the route identification information comprises an identification sequence assigned by the route calculation server based on the calculated route data.

9. The system according to claim 5, wherein the route identification information comprises an identification sequence assigned by the route calculation server based on the calculated route data.

10. The system according to claim 7, wherein the route identification information comprises an identification sequence assigned by the route calculation server based on the calculated route data.

* * * * *